Patented Apr. 8, 1930

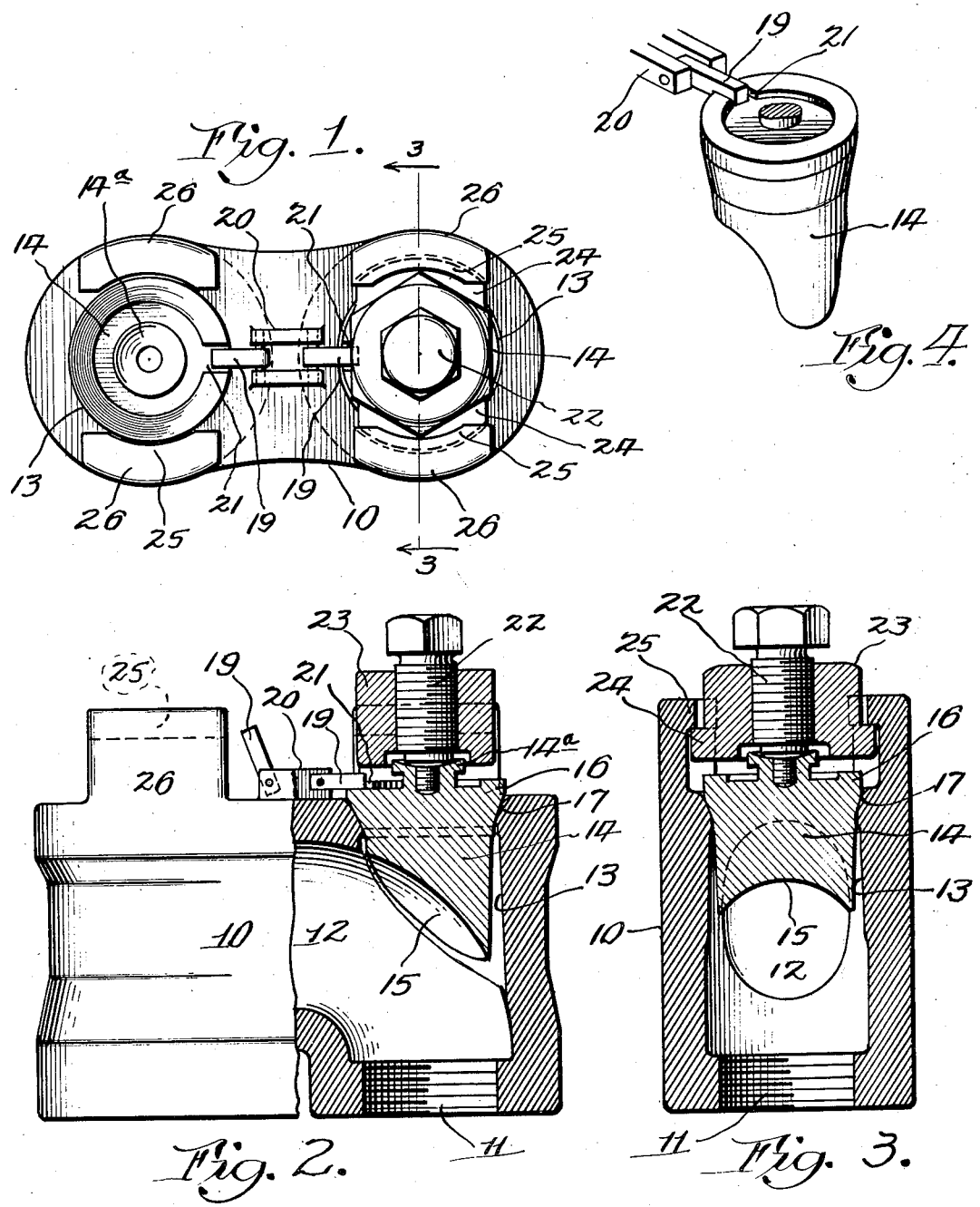

1,753,387

UNITED STATES PATENT OFFICE

ELWOOD K. PIERCE, OF SPRINGFIELD, OHIO, ASSIGNOR TO THE OHIO STEEL FOUNDRY COMPANY, OF LIMA, OHIO, A CORPORATION OF OHIO

PIPE-BEND PLUG

Application filed March 1, 1928. Serial No. 258,244.

This invention relates to improvements in locking closures for pressure systems, and more particularly to bend fittings such as used in oil tube stills or cracking units, although not necessarily limited to such use.

The principal object of the invention is to provide an improved construction for pipe bend fittings of the character described, including a readily removable curved deflector plug at the end of each pipe section, whereby substantially uniform cross sectional area of the conduit is maintained at the bend, so as to eliminate pressure losses at this point, and further, to provide a simple and efficient construction for locating and maintaining said deflector plugs in their proper positions.

The invention may best be understood by reference to the accompanying drawings, in which Figure 1 is a top plan view of a pipe bend constructed in accordance with my invention, but with one of the locking heads removed, Figure 2 is a side view of the pipe bend shown in Figure 1, with one-half thereof shown in vertical section, Figure 3 is a section taken on line 3—3 of Figure 1, and Figure 4 is a fragmentary detail view showing the arrangement of the deflector plug and its locking device.

Referring to details of the drawings, 10 indicates the body of a 180° pipe bend fitting of the type utilized in tube stills or the like, adapted to have a pair of tubes (not shown) attached thereto in parallel relation, as by screwing them in the threaded openings 11, 11, as usual. The body of the bend is provided with a semi-circular passage 12, of uniform circular cross sectional area, excepting where communicating with two circular plug openings 13, opposite the threaded pipe openings 11, 11, as shown.

Closure plugs 14, 14, are fitted in the openings 13, 13, and herein being similar in construction, the description of one will suffice for the understanding of both.

Each of said plugs is provided with a curved inner face 15, which, when the plug is in closed position as shown in Figures 2 and 3, conforms to the curved shape of the passage 12.

The upper end of the plug 14 is closely fitted in the opening 13, as by an enlarged head 16 bearing against a seat 17. In order to insure a pressure-tight joint, the head 16 is preferably ground in its seat, in the usual manner.

Means are provided for disposing the plug 14 with its curved face 15 in its proper position relative to the bend, said means herein comprising a hinged latch 19, preferably mounted on lugs 20 on the upper face of the bend adjacent the edge of the plug opening 13, and adapted, when swung in lowered position, to engage a notch 21 formed in the upper face of plug 14, as clearly shown in Figure 4.

Suitable means are provided for securing the plug 14 in place, herein comprising a locking device of the type broadly disclosed in my copending application Serial No. 157,931 filed December 31, 1926. As shown herein, said device comprises a set screw 22, having threaded engagement with a removable locking piece 23 having laterally projecting lugs 24, 24, arranged to rotate beneath projecting locking flanges 25, 25, carried on upstanding members 26 on opposite sides of the plug opening 13. The arrangement is such that when the set screw is sufficiently withdrawn, the locking piece may be fitted between the upstanding pieces 26, 26, and rotated so that the lugs 24, 24, pass beneath flanges 25, 25, as shown in Figure 1, 2 and 3. The set screw may then be screwed down upon the head 14ª of plug 14 to hold it tightly in place.

It will be observed in Figure 2 that the latch 19 is of such height that the locking piece 23 cannot be engaged beneath the flanges 25, 25, unless the latch is seated in the notch 21 provided for it. Furthermore, the locking piece holds the end of the latch 19 so that it cannot be withdrawn from its notch, until said locking piece is removed from its locking engagement beneath said flanges 25, 25.

A pipe bend constructed as above described has the advantage of affording readily removable plugs for cleaning both sections of tubing connected therewith, and when said plugs are in closed position, to afford a complete 180° curved return bend of uniform circular cross sectional area, so as to minimize the pressure losses usually occurring at the bend.

While I have shown and described one particular embodiment and application of my invention, it will be understood that I do not wish to be limited to the construction or use therefor shown and described, but that various changes and modifications may be made without departing from the spirit and scope of my invention.

I claim as my invention:

1. In a pipe bend fitting having a curved inner passage, a plug closure having an inner surface curved to conform with and forming part of said curved passage, a locking piece for said plug engageable beneath upstanding portions of said fitting at opposite sides of said plug, and a hinged member on said fitting arranged to extend between said upstanding portions into interlocking engagement with said plug to position the latter in proper angular relation to said inner passage.

2. In a pipe bend fitting having a curved inner passage, a plug closure having an inner surface curved to conform with and forming part of said curved passage, a locking piece for said plug engageable beneath upstanding portions of said fitting at opposite sides of said plug, and a hinged member on said fitting arranged to extend between said upstanding portions into interlocking engagement with said plug to position the latter in proper angular relation to said inner passage, said hinged member preventing locking engagement of said locking piece unless said hinged member is in proper interlocked engagement with said plug.

3. In a pipe bend fitting having a curved inner passage, a plug closure having an inner surface curved to conform with and forming part of said curved passage, a locking piece for said plug engageable beneath upstanding portions of said fitting at opposite sides of said plug, and a hinged member on said fitting arranged to extend between said upstanding portions into interlocking engagement with said plug to position the latter in proper angular relation to said inner passage, said locking piece preventing removal of said hinged member from its interlocking engagement with said plug when said locking piece is in locked position.

Signed at Springfield, Ohio, this 23rd day of February, 1928.

ELWOOD K. PIERCE.